United States Patent [19]

Tanjo et al.

[11] Patent Number: 4,811,050

[45] Date of Patent: Mar. 7, 1989

[54] APPARATUS FOR THE FORMING OF IMAGES WITH A CLEANING DEVICE FOR A CORONA WIRE

[75] Inventors: Toru Tanjo, Toyonaka; Toshio Yamanaka; Takahiro Wakikaido, both of Yao; Masaru Hatano, Amagasaki; Nobuyuki Hirata, Sakai; Kazuya Kamidaira, Toyonaka, all of Japan

[73] Assignee: Mita Industrial Co., Ltd., Osaka, Japan

[21] Appl. No.: 108,592

[22] Filed: Oct. 14, 1987

[30] Foreign Application Priority Data

Oct. 15, 1986 [JP] Japan .................... 61-245117
Dec. 26, 1986 [JP] Japan .................... 61-313889

[51] Int. Cl.[4] .................... G03B 15/02
[52] U.S. Cl. .................... 355/3 CH
[58] Field of Search .......... 355/3 CH, 15, 3 R, 30 R; 250/324; 361/230

[56] References Cited

U.S. PATENT DOCUMENTS

| | | | |
|---|---|---|---|
| 3,891,846 | 6/1975 | Ito | 361/230 X |
| 3,965,400 | 6/1976 | Tolliver | 361/229 |
| 4,470,689 | 9/1984 | Nomura et al. | 355/3 DR X |
| 4,566,777 | 1/1986 | Honda et al. | 355/3 CH X |
| 4,734,580 | 3/1988 | Rodrigo et al. | 361/230 X |

FOREIGN PATENT DOCUMENTS

| | | | |
|---|---|---|---|
| 54-146635 | 11/1979 | Japan | 355/3 CH |
| 58-186761 | 10/1983 | Japan . | |
| 58-173757 | 10/1983 | Japan . | |
| 59-111656 | 6/1984 | Japan . | |
| 60-68557 | 5/1985 | Japan . | |
| 60-249169 | 12/1985 | Japan | 355/3 CH |
| 61-39080 | 2/1986 | Japan | 355/15 |
| 61-117579 | 6/1986 | Japan . | |

*Primary Examiner*—Arthur T. Grimley
*Assistant Examiner*—J. Pendegrass
*Attorney, Agent, or Firm*—Armstrong, Nikaido, Marmelstein & Kubovcik

[57] ABSTRACT

An apparatus for the formation of images having a body of the apparatus provided with a corona charger, in which a corona wire is strung along a charging opening of the corona charger. An image-forming device is installed in the body of the apparatus. The device is removable from the body of the apparatus along the corona wire. The apparatus further includes a cleaning device that is attached to the end portion of the image-forming device opposite to the direction in which the image-forming device is pulled out of the body of the apparatus. The cleaning device touching the corona wire through the charging opening when the image-forming device moves along the corona wire and separating from the corona wire when the image-forming device is installed into the body of the apparatus.

18 Claims, 14 Drawing Sheets

APPARATUS FOR THE FORMING OF IMAGES WITH A CLEANING DEVICE FOR A CORONA WIRE

BACKGROUND OF THE INVENTION

1. Field of the invention

This invention relates to an apparatus for the formation of images, such as electrophotographic copying machines, laser beam printers, etc.

2. Description of the prior art:

For example, a corona charger that is used to charge the photosensitive drum of an electrophotographic copying machine with electricity generally makes use of a tugsten corona wire extended within a box-shaped shield box. The box-shaped shield box has an opening for use in the corona charging, along the corona wire, so as to face the photosensitive drum, and corona charging takes place when high voltage is applied to the corona wire, resulting in a uniform charging of the photosensitive drum. In this way, when corona charging is done by means of the corona charger, Si-type gas such as silane ($SiH_4$) contained in the surrounding gas form silicon compounds such as $SiO_2$, etc., on the surface of the corona wire. These silicon compounds cause a steep decrease in the corona charging power of the corona wire, resulting in a lack of uniformity of the charging of the photosensitive drum by the corona charger and patches in the surface charge of the photosensitive drum, which causes difficulties in obtaining distinct images. For this reason, it is necessary to remove the silicon compounds attached to the corona wire regularly.

A cleaning apparatus for the corona wire has disclosed by, for example, Japanese Laid Open Utility Model Publication No. 60-68557, wherein the cleaning apparatus has a corona charger that can be removed from the body of the cleaning apparatus, and a corona wire cleaning means is attached to the body of the cleaning apparatus. In order to clean the corona wire, it is necessary to remove the corona charger from the body of the cleaning apparatus. In general, in image-forming apparatuses, the corona charger is fixed in place inside the body of the apparatus, so in such a case, the apparatus must be redesigned so that it is possible to remove the corona charger from the body of the apparatus so as to clean the corona charger. Even if as such a construction is made, it is very troublesome for the users of the image forming apparatus to remove the corona charger from the body of the apparatus just for the purpose of cleaning the corona wire. Also, in the cleaning apparatus disclosed in the Laid-Open Publication mentioned above, the corona wire is sandwiched into a part of the cleaning means in order to clean the wire. When external power is applied to the corona wire during the cleaning operation and the corona wire is pulled from where it is extended within the shield box, there is the possibility that the corona wire will be broken.

SUMMARY OF THE INVENTION

The apparatus for the formation of images of this invention, which overcomes the above-discussed and numerous other disadvantages and deficiencies of the prior art, comprises the body of the apparatus provided with a corona charger, in which a corona wire is strung along a charging opening of the corona charger, and an image-forming device that is installed in the body of the apparatus, the image-forming device being removable from the body of the apparatus along the corona wire. The apparatus further comprises a cleaning device that is attached to the end portion of the image-forming device opposite to the direction in which the image-forming device is pulled out of the body of the. The cleaning device touches the corona wire through the charging opening when the image-forming device moves along the corona wire, and separates from the corona wire when the image-forming device is installed into the body of the apparatus.

In a preferred embodiment, the cleaning device is a brush comprising the body of the brush and brush portion fixed to the body, the brush portion being able to touch the corona wire.

In a preferred embodiment, the body of the cleaning device is attached to the end of the image-forming device opposite to the direction in which the image-forming device is pulled out of the body of the apparatus. The brush portion of the cleaning device is flexible and is bent by pressure by a fixed means of the body of the apparatus at the time when the image-forming device is installed into the body of the apparatus, thereby separating from the corona wire.

In a preferred embodiment, the body of the cleaning device is movably attached to the end of the image-forming device opposite to the direction in which the image-forming device is pulled out of the body of the apparatus.

In a preferred embodiment, the body of the cleaning device is disposed within a box fixed to the end of the image-forming device so that it is pushed by a spring so as to permit the brush portion of the cleaning device to touch the corona wire. The body of the cleaning device is guided by a guiding device in the direction opposite to that of the force of the spring when the image-forming device is installed into the body of the apparatus, which causes the separation of the brush portion of the cleaning device from the corona wire.

In a preferred embodiment, the body of the cleaning device is attached to a rotatable device, as one piece, which is disposed on the end of the image-forming device so as to be rotatable in a circular arc or around its axis. The rotatable device can rotate at right angles to the corona wire. The rotatable device comprises a rotatable part that is made in one piece with the body of the cleaning device, and a sliding plate that is engaged with the rotatable part so as to be able to slide in the direction in which the image-forming device is pulled from the body of the apparatus. The sliding of the sliding plate results in the rotation of the rotatable part. The sliding plate is pushed by the spring so that the brush portion of the cleaning device touches the corona wire when the image-forming device is pulled from the body of the apparatus. The rotatable plate slides in the direction opposite to that of the force of the spring so that the brush portion of the cleaning device separates from the corona wire when the image-forming device is installed into the body of the apparatus.

In a preferred embodiment, the rotatable device rotates in a circular arc or around its axis in the plane that includes the corona wire. The rotatable device rotates in a circular arc while touching the guide device disposed on the innermost portion inside of the body of the apparatus positioned in the direction opposite to the direction in which the image-forming device is pulled from the body of the apparatus. The guide device is a guide rack, and the rotatable device has gears that are engaged with the rack.

In a preferred embodiment, the rotatable device is rotatable around its axis. The cleaning device comprises the body of the cleaning device and brush portion that is radially fixed to the body of the cleaning device. The rotatable device rotates while moving on a guide device disposed over the whole region of the charging opening of the charger. The guide device is curved so that it is separated from the corona wire at the end of the body of the apparatus in the direction opposite to the direction in which the image-forming device is pulled from the body of the apparatus. The rotatable device is guided by the guide device, and rotates. The guide device is composed of guide racks, and the rotatable device is composed of pinion gears that are engaged with the guide racks. A cleaning device is disposed in the region where the brush portion of the cleaning device rotates, whereby matters that has adhered to the brush portion is removed when the brush portions touches the cleaning device during its rotation.

Thus, the invention described herein makes possible the objectives of (1) providing an apparatus for the formation of images in which the image-forming device comprising at least one device selected from a developing apparatus, a photosensitive drum, and a cleaning apparatus can be installed into and removed from the body of the apparatus. The image-forming device has a cleaning device that cleans the corona wire of the corona charger at the time of the removal of the device, so when the image-forming device is removed from the apparatus for a purpose such as the addition of toner, the removal of a paper jam, the repair of the cleaning apparatus, etc., the corona wire will inevitably be cleaned, so that a special operation in which the corona wire is cleaned is no longer necessary; (2) providing an apparatus for the formation of images in which the cleaning device is in the shape of a brush, so that there is no possibility of the corona wire being pulled, and therefore, there is no possibility that the corona wire be broken at the time of its cleaning; (3) providing an apparatus for the formation of the images in which when the image-forming device is installed into the body of the apparatus, the cleaning device is rotatable in a plane that includes the corona wire, or rotates along a plane at right angles to the direction in which the image-forming device is removed, so that the brush portion of the cleaning device does not touch the corona charger, etc., which prevents electric current from leaking from the corona wire to the photosensitive drum, and moreover the brush portion of the cleaning device is not curved, which causes an extension of the life of the cleaning device; (4) providing an apparatus for the formation of images in which at the time of the removal of the image-forming device from the body of the apparatus, the cleaning device is rotated by means of racks and gears, and its brush portion touches the corona wire, so that there is no shock when the corona wire is touched by the cleaning device, which reliably prevents the breaking of the corona wire; and (5) providing an apparatus for the formation of the images in which the cleaning device moves on the corona wire while touching the corona wire, so that the force directed at the corona wire is small, and the prevention of breakage of the corona wire during cleaning is still more certain, and moreover when the brush-shaped cleaning device rotates, its brush portion touches a cleaning device positioned in the region where the brush portion rotates, which allows for the cleaning of the brush portion.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

EXAMPLE 1

Figure 1:
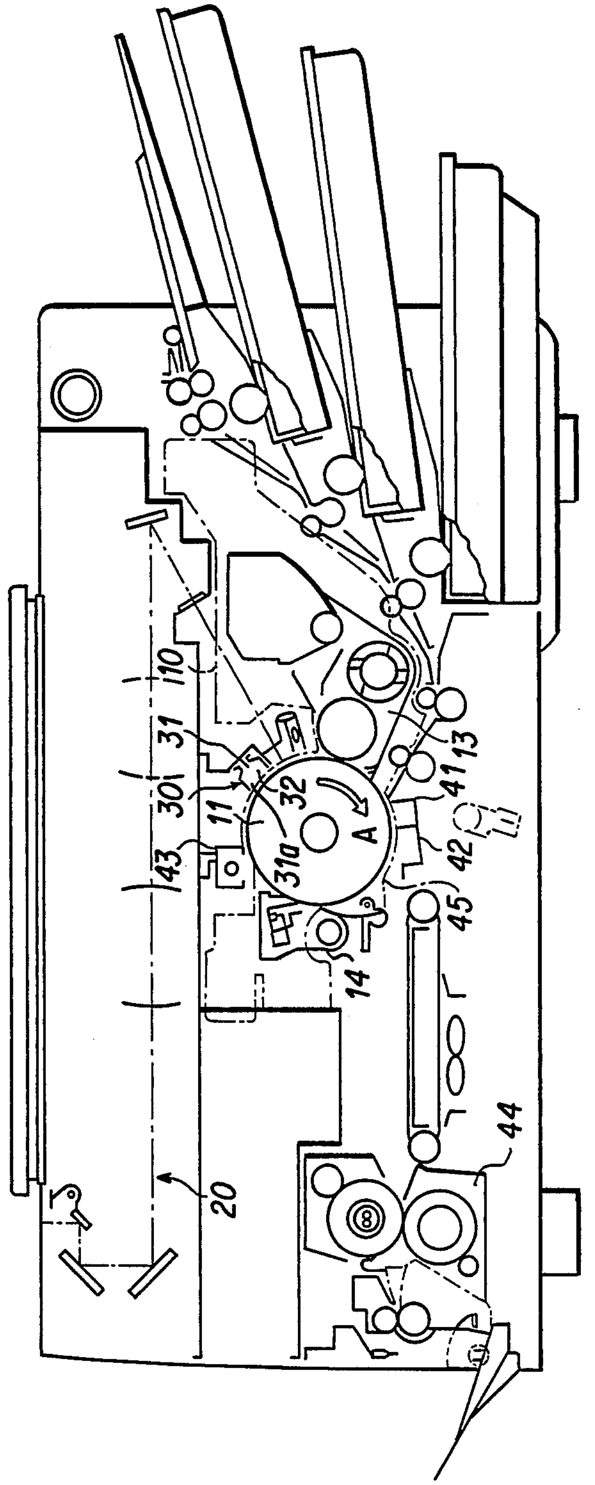
FIG. 1 is a cross-sectional view showing the electrophotographic copying machine that is an image formation apparatus of this invention.

The electrophotographic copying machine that is an image formation apparatus of this invention has, as shown in FIG. 1, an optical system 20 in the upper part, and a photosensitive drum 11 in the center area of the lower part.

The photosensitive drum 11 can rotate in the direction shown by arrow A, and a charging apparatus 30, containing a corona charger, is disposed above the drum 11. The charging apparatus 30 has a corona wire 32 strung along the opening 31*a* that is provided inside shield box 31. The charging apparatus 30 is installed in the copy machine so that the corona wire 32 is parallel to the central axis of the photosensitive drum 11.

In the downstream direction of the rotation of photosensitive drum 11 of the charging apparatus 30, the optical system 20, provided in the upper part of the copy machine, exposes the photosensitive drum 11. In the downstream direction of the rotation of the photosensitive drum 11 of the area exposed by the optical system 20, a developing device 13 is disposed.

Underneath the photosensitive drum 11, there is a transcription device 41 that uses the corona charger and a separation device 42 in a line. Transcription-paper conveyance route 45 passes in the spaces between the photosensitive drum 11 and the transcription device 41 and between the photosensitive drum 11 and the separation device 42. Transcriptionpaper conveyance route 45 passes toward the fixing means 44 provided toward the side of the machine. In the downstream direction of the rotation of photosensitive drum 11 of the separation device 42, there is a cleaning apparatus 14, and further downstream from that there is a discharging device 43.

Figure 2:
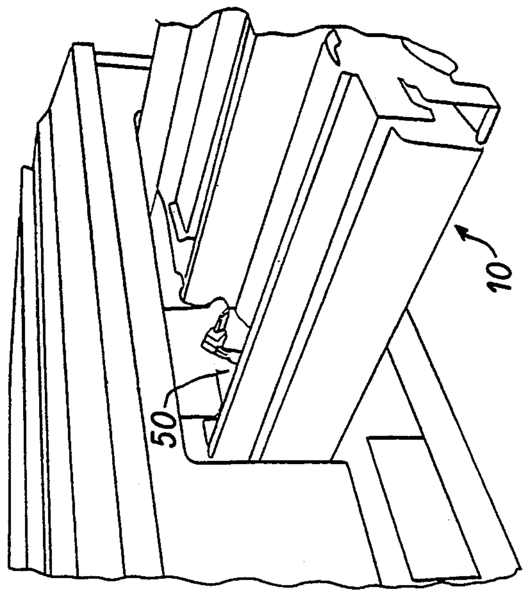
FIG. 2 is a perspective view showing a part of that machine.

The photosensitive drum 11, the developing device 13, and cleaning apparatus 14 are, as shown in FIG. 2, made into one unit as an image-forming unit 10, which can be moved along the axis of the photosensitive drum 11, that is, in the direction in which the corona wire 32 of charger 30 is strung. When the toner inside developing device 13 is consumed, and new toner is to be added into the developing device 13, or when paper has jammed in the transcription-paper conveyance route, or when the cleaning apparatus 14 is repaired, the image-forming unit 10 can be removed from the machine. The imageforming unit 10 comprises at least one of photosensitive drum 11, developing device 13, and cleaning apparatus 14.

Figure 4:
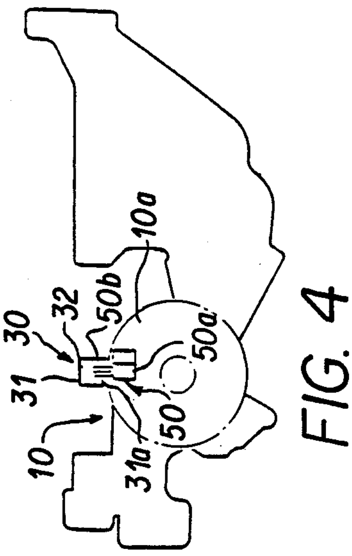
FIG. 4 is a back view showing the image-forming means of that machine.
Figure 3:
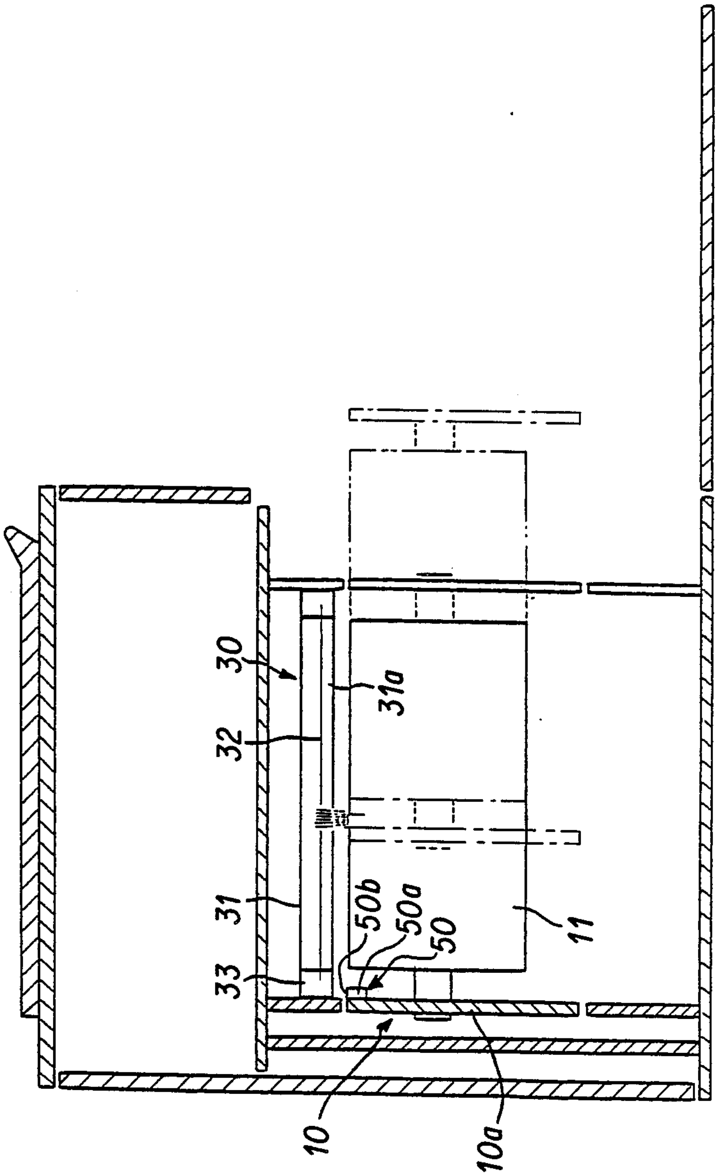
FIG. 3 is a cross-sectional view showing th interior portion of that machine.

A cleaning means 50 is fixed at the end of the image-forming unit 10 opposite to the direction in which the image-forming unit 10 is pulled out. Particularly, the cleaning means 50 is fixed to the side plate 10*a* of the photosensitive drum 11 as shown in FIG. 3. The cleaning means 50 is a brush comprising, as shown in FIGS. 3 and 4, the body 50*a* of the brush and a flexible brush portion 50*b* fixed to the body 50. As shown in FIG. 3 by the lines with paired dots, when the image-forming unit 10 is being removed from the machine, the brush portion 50*b* passes through the opening 31*a* for corona charging of the charger 30 so as to touch the corona wire 32. When the image-forming unit 10 is installed in the machine, the brush portion 50*b* of the cleaning means 50 is separated from the corona wire 32 of the charger 30, as shown by the solid lines in FIG. 3, and positioned at the innermost end of charger 30 in such a way that the brush portion 50*b* is curved by pressure by the wire support 33 that is insulated from the corona wire 32. Therefore, when corona wire 32 is charged with voltage and charges the photosensitive drum 11 with electricity, the brush portion 50*b* of the cleaning means 50 is separated from the corona wire 32, and there is no risk that there will be a leak of electricity from the corona wire 32 to the photosensitive drum 11 via the cleaning means 50.

In an electrophotographic copying machine with this kind of construction, the image-forming unit 10 is positioned within the machine, and copy images are formed by the ordinary electronic copying processing. That is, a high voltage is applied to the corona wire 32 of the charger 30 so as to achieve a uniform electric charge of the photosensitive drum 11, and the electrically charged photosensitive drum 11 is exposed to an image of the manuscript by the optical system 20, so that a latent image is formed. This laent image is developed witth toner by the developing apparatus 13. The toner image is transcribed onto transcription paper that is conveyed along the transcription-paper conveyance route 45 by means of transcription device 41. Thet transcribed transcription paper on which the toner image has been transcribed is separated from the photosensitive drum 11 by the separator device 42, and then the toner image is fixed onto the transcription paper by the fixing device 44 before being ejected to the outside of the machine. After the toner image has been transcribed, the remaining toner is cleaned from the surface of the photosensitive drum 11 by the cleaning apparatus 14.

In this way, a copy image of toner on transcription paper is obtained. Each time a copy image is formed, some of the toner inside the developing device 13 is consumed, and when about 3000–5000 pages of transcription paper have had copy images formed thereon, the toner inside the developing device 13 is completely used up, so that it becomes necessary to replenish the toner inside the developing device 13.

When toner is being supplied to the developing device 13, the image-forming unit 10 is pulled in the direction of the axis of the photosensitive drum 11, and the brush portion 50*b* on the top of the cleaning means 50 at the end of the unit 10 opposite the direction in which the unit is pulled out touches the corona wire 32 of the charger 30, and is moved along the corona wire 32 in a direction parallel to the axis of the photosensitive drum 11, which causes the removal of silicon compounds, etc., from the corona wire 32.

Moreover, when the toner has been added to the developing device 13 and the image-forming unit 10 is being replaced into the inside of the machine, then, the cleaning means 50, likewise, moves along the corona wire 32 so as to clean the corona wire 32. Then when the image-forming unit 10 is again installed into the machine, the brush portion 50*b* of the cleaning means 50 is bent by the wire support 33 inside of the corona charger 30 so that they separate from the corona wire 32. Therefore, there is no risk that the corona wire 32 will leak electricity from the cleaning means 50 to the photosensitive drum 11.

In this way, not only when the toner is being supplied to the developing apparatus 13, but also when paper jams into transcription-paper conveyance route 45 or when the cleaning apparatus 14 is repaired, the image-forming unit 10 is pulled from the machine, and each time the unit 10 is removed, the corona wire 32 is cleaned by the cleaning means 50.

Example 2

Figure 5:
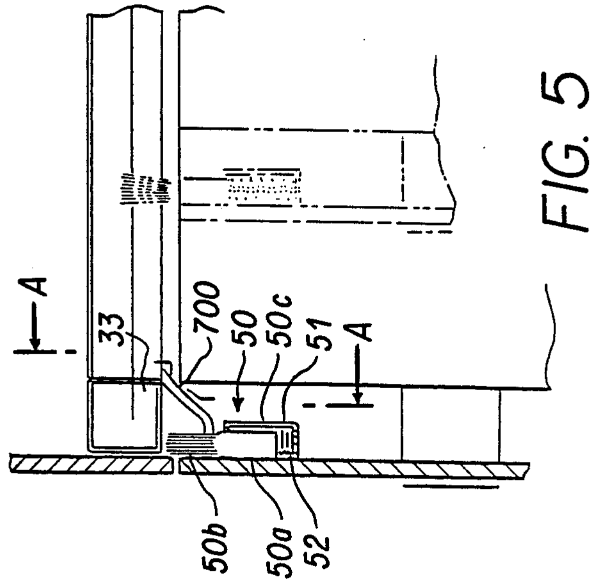
FIG. 5 is a cross-sectional view showing a part of another machine of this invention.
Figure 6:
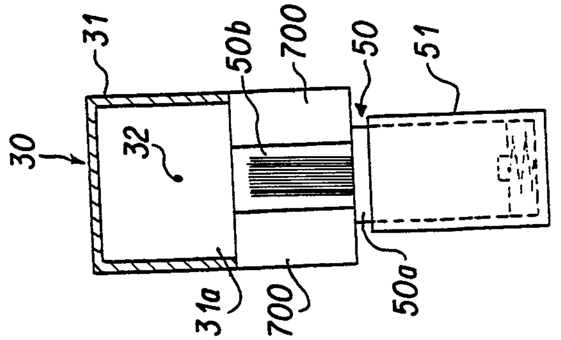
FIG. 6 is a sectional view taken along line A—A of FIG. 5.

FIGS. 5 and 6 show another image-formation apparatus of this invention, in which a cleaning means 50 is disposed within a box 51 so that it can move up and down inside of the box 51. The cleaning means 50 is held in the upward position by a pushing spring 52 inside of the box 51, projecting out of the opening formed in the top surface of the box 51. In the lower part of the body 50*a* of the cleaning means 50, there is a projection 50*c* provided so as to prevent the removal of the cleaning means 50 from the box 51. The projection 50*c* engages with the edge of the opening of the box 51 and prevents the cleaning means 50 from being removed.

A pair of guide plates 700 is fixed to the bottom of the wire supports 33 at the far side of the charger 30 as shown in FIG. 6. The guide plates 700 are positioned with an appropriate space therebetween and the innermost portion of each guide plate 700 slants in the downward direction. The body 50*a* of the cleaning means 50 is in contact with the guide plates 700 at their upper surfaces. When the cleaning means 50 touches the guide plates 700, the brush portion 50*b* of the cleaning means 50 is positioned in the space between the guide plates 700, and when the image-forming unit 10 is inside of the machine, the cleaning means 50 is guided by both guide plates 700 to move in the downward direction, and the tip of brush portion 50*b* is separated from the corona wire 32. Then, when image-forming unit 10 is entirely inside of the machine, the tip of brush portion 50*b* of the cleaning means 50 no longer touches the bottom surface of the wire supports 33.

In an image-formation apparatus with this kind of construction, when the image-forming unit 10 is pulled from the machine, the cleaning means 50 is moved upward by the force of a pushing spring 52, while being guided upward by the guide plates 700. By this movement, the brush portion 50*b* is brought to touch the corona wire 32. Then, as the image-forming unit 10 is pulled away, the brush portion 50*b* comes into contact with the corona wire 32, cleaning it.

In the same way as when the image-forming unit 10 is installed in the machine, the brush portion 50*b* of the cleaning means 50 comes into contact with the corona wire 32 to clean it. When the cleaning means 50 reaches the back interior area of the machine, the cleaning means 50 touches the guide plates 700. Then, when the cleaning means 50 is pushed still farther into the inside, its body 50*a* is pushed downward by the guide plates 700 so as to be pushed into the box 51. When image-forming unit 10 is installed in the machine, the tip of brush portion 50*b* of the cleaning means 50 does not touch the charging device 30. For this reason, even when the image-forming unit 10 is installed in the machine, the brush portion 50*b* of the cleaning means 50 is not bent by force, so its lifespan is considerably improved.

EXAMPLE 3

Another image-formation apparatus of this invention is shown in FIGS. 7–12, in which a rotatable means 6 is attached to the side plate 10*a* of the photosensitive drum 11 so that the rotatable means 6 can rotate at right angles to the corona wire, and it is attached as one piece to the cleaning means 50.

Figure 7:
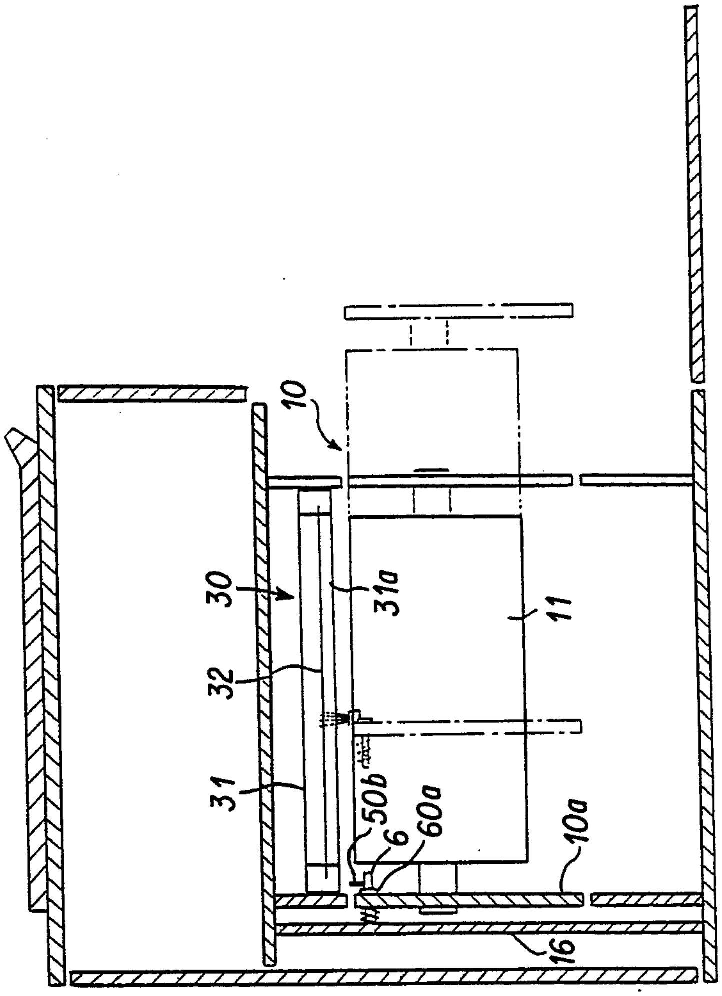
FIG. 7 is a cross-sectional view showing another machine of this invention.
Figure 10:
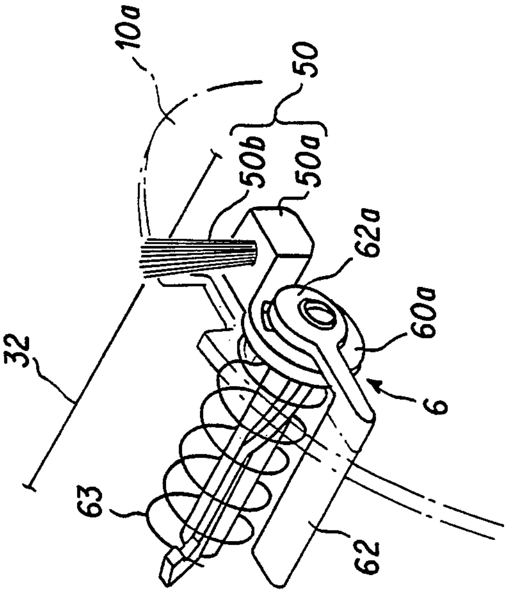
FIGS. 8 and 10 are diagrams showing the movement of a part containing the cleaning device of FIG. 7.
Figure 8:
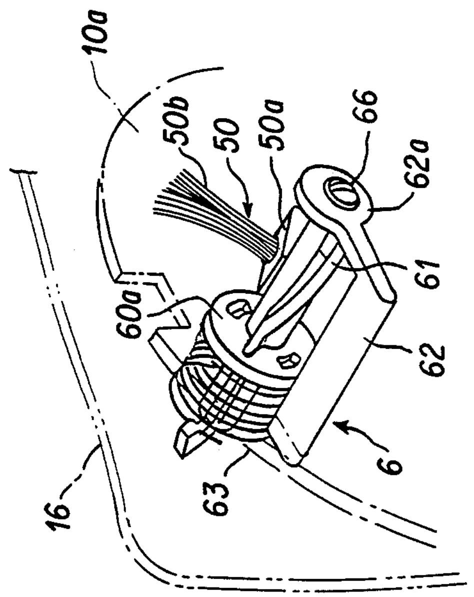
Figure 9:
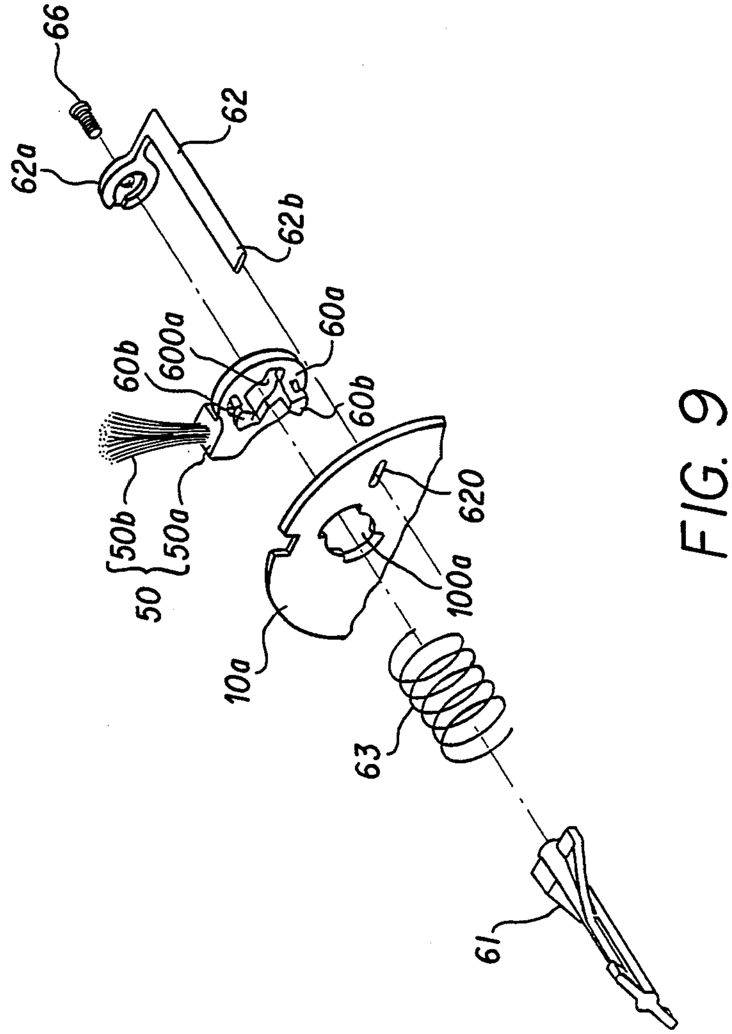
FIG. 9 is a diagram showing the decomposition of the part containing the cleaning device of FIG. 7.
Figure 11:
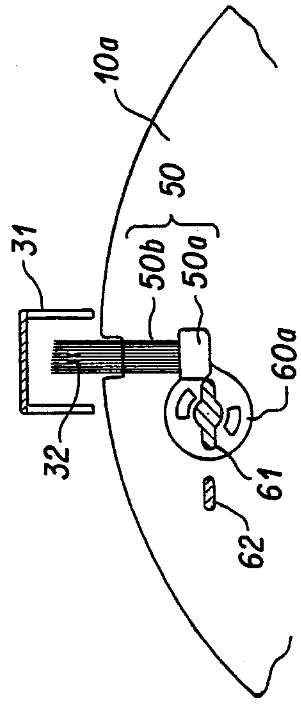
FIG. 11 is a cross-sectional view showing the part of the apparatus shown in FIG. 10.
Figure 12:
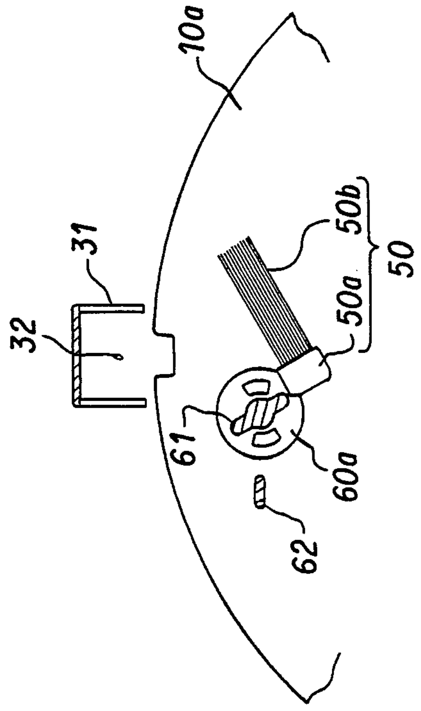
FIG. 12 is a cross-sectional view showing the part of the apparatus shown in FIG. 8.
Figure 13:
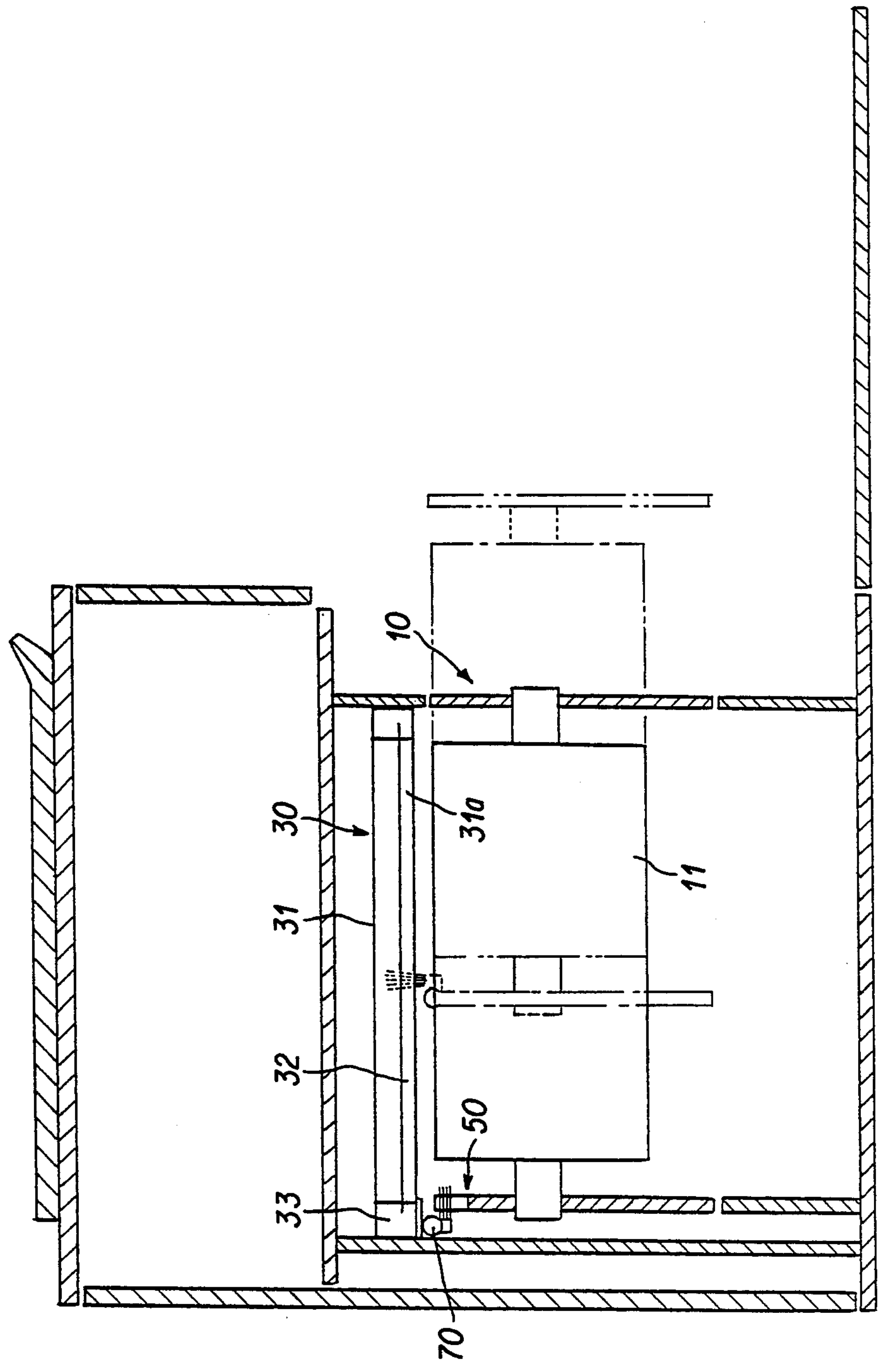
FIG. 13 is a cross-sectional view showing another image-formation apparatus of this invention.
Figure 14:
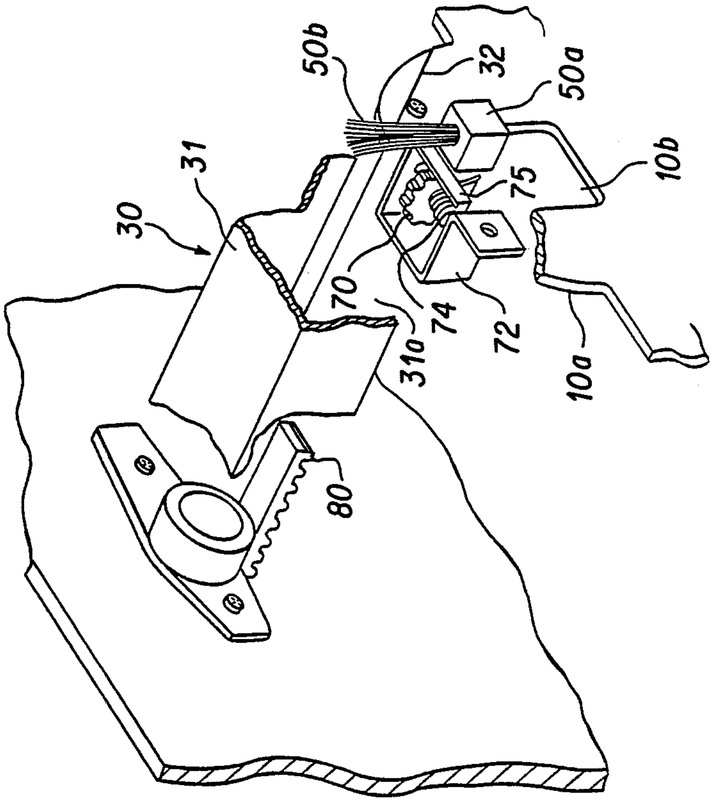
FIG. 14 is a perspective view showing a part of the apparatus of FIG. 13.
Figure 15:
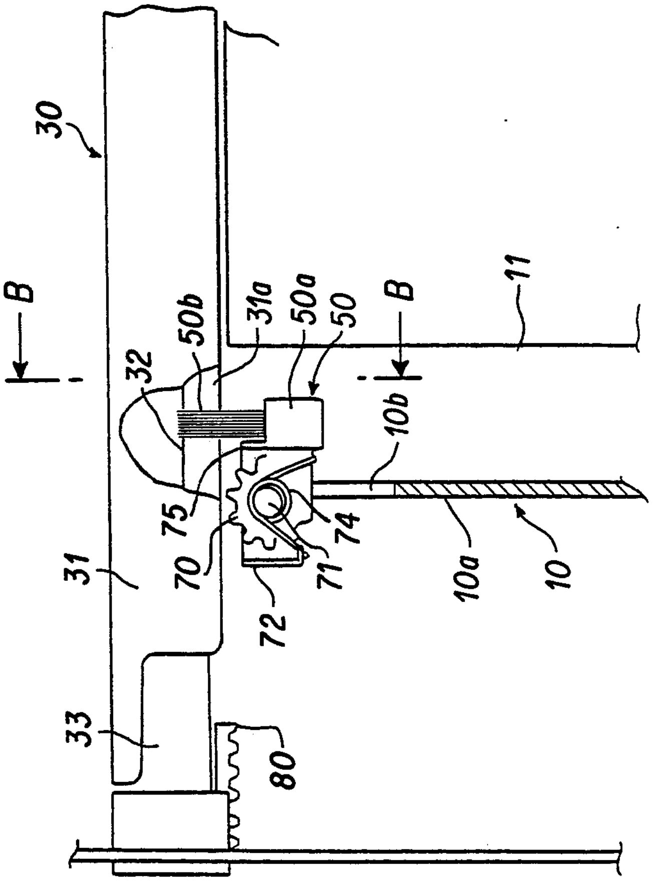
FIG. 15 is a side cross-sectional view showing the part of the apparatus of FIG. 13.
Figure 17:
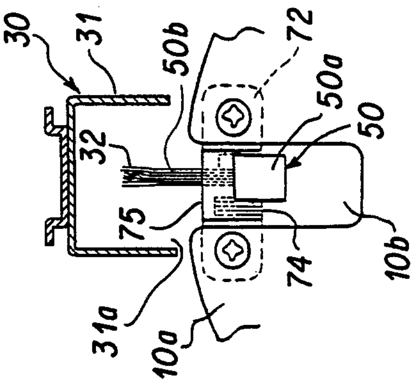
FIG. 17 is a cross-sectional view showing the part of the apparatus shown in FIG. 15 along line B—B.

The rotatable means 6 has, as shown in FIGS. 8 and 9, a rotatable part 60*a*, a sliding plate 61, and a guide plate 62. The rotatable part 60*a* is made in one piece with body 50*a* of the cleaning means 50. The rotatable part 60*a* has a hole 600*a*. The sliding plate 61 can be moved in the direction in which the image-forming unit 10 is pulled (the direction in which the corona wire 32 is strung within the corona charger 30) via both the hole 100*a* of the side plate 10*a* of the drum 11 and the hole 600*a* of the rotatable part 60*a*. The guide plate 62 functions to guide the sliding plate 61, so that it prevents the sliding plate 61 from rotating when the sliding plate 61 slides within the hole 100*a* of the side plate 10*a*. The rotatable part 60*a* mentiond above is fixed so that it can rotate on the edge of the hole 100*a* of the side plate 10*a*. Stoppers 60*b* are disposed on the edge of the hole 60*a* of the rotatable part 60*a* as one piece, and are engaged with the edge of the hole 100*a* of the side plate 10*a* so that the rotatable part 60*a* rotates within the hole 100*a* of the side plate 10*a* without separating from the side plate 10*a* while the sliding plate 61 is sliding. One end 62*a* of the guide plate 62 is fixed with screw 66 on the end of the sliding plate 61, and the other end 62*b* is formed in the free end that passes hole 620 of the side plate 10*a*. The sliding plate 61 has a spring 63, and by its spring force, the end 62*a* of the guide plate 62 that is fixed to the tip of the sliding plate 61 is always kept touching the rotatable part 60*a*. The sliding plate 61 is made in a twisted shape so that ends of the sliding plate 61 in the sliding direction are at right angles to each other. For that reason, when the sliding plate 61 slides within the hole 100*a* of the side plate 10*a* and within the hole 600*a* of the rotatable part 60*a*, the rotatable part 60*a* turns in its center along the twisted shape of the sliding plate 61. While the image-forming unit 10 is pulled from its fixed position in the machine or while it is installed in a fixed position, as shown in FIG. 10, the sliding plate 61 is pushed out to its fullest extent from the back of the side plate 10*a* by the force of spring 63. At this time, the rotatable part 60*a* permits the brush portion 50*b* of the cleaning means 50 to touch the corona wire 32 (FIGS. 10 and 11), so that the corona wire 32 is cleaned by the brush portion 50*b*. When the image-forming unit 10 is installed in its fixed position inside of the machine, then, as shown in FIG. 7 and FIG. 8, the ends of the sliding plate 61 are pushed against the side plate 16 on the back of the side plate 10*a*. For that reason, the sliding plate 61 slides within the holes 100*a* and 600*a*, and comes to protrude from the front surface of the side plate 10*a*. The result is that, as shown in FIG. 12, the rotatable part 60*a* revolves in that center along the twisted shape of the sliding plate 61, making it possible for the brush portion 50*b* and the corona wire 32 to separate.

In Examples 1–3 mentioned above, when the image-forming unit 10 is pulled from the machine, the cleaning means 50 does not take up space in the direction of the axis of the drum 11, which makes the installation and removal of the drum 11 more easy.

EXAMPLE 4

FIGS. 13–17 show another image-formation apparatus of this invention, in which the cleaning means 50 is attached to a rotatable means 70. The rotatable means 70 can rotate in the plane that includes the corona wire 32 of the corona charger 30. The rotatable means 70 has, for example, gears on its outer perimeter, and the body 50*a* of the cleaning device 50 is attached to the rotatable means 70 as one piece. The rotatable means 70 is supported by a support shaft 71 so as to be able to rotate. The support shaft 71 is supported inside of brackets 72 that are attached to the side plate 10*a* of the image-forming unit 10.

The cleaning device 50 is engaged with one end of a coiled spring 74 supported by the support shaft 71. The other end of the coiled spring 74 is engaged with the bracket 72, and pushes the cleaning device 50 in the upward direction. The bracket 72 has a stopper 75 that controls the rotation of the cleaning device 50 in the upper direction caused by the force of the coiled spring 74, so that the cleaning device 50 can be at a fixed position on the upper part of the cut-out area 10*b* of the side plate 10*a*. When the cleaning device 50 is moved in the upward direction by the force of the coiled spring 74, it is placed inside of the image-forming unit 10 through the cut-out area 10*b* of the side plate 10*a*. In these circumstances, the cleaning device 50 is controlled in its rotation upward by the stopper 75. At this time, the cleaning device 50 has its brush portion 50*b* become almost perpendicular. The brush portion 50*b* touches the corona 32 of the charger 30 with its tip when the image-forming unit 10 is pulled out.

Figure 16:
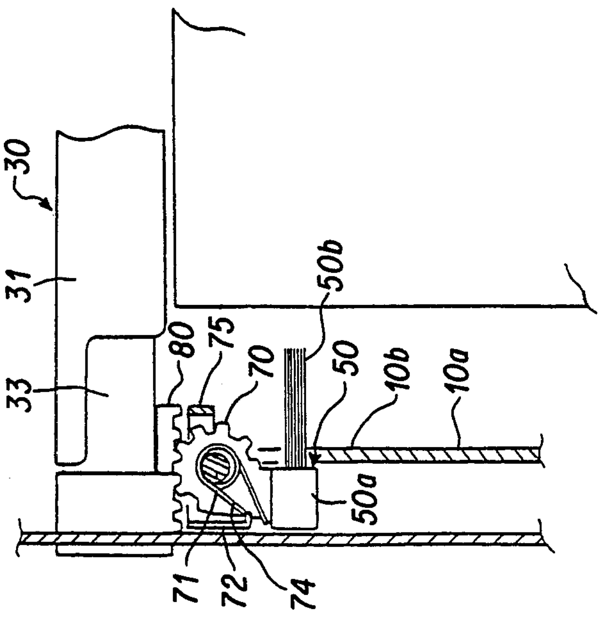
FIG. 16 is a diagram showing the movement of a part of the apparatus of FIG. 13.
Figure 18:
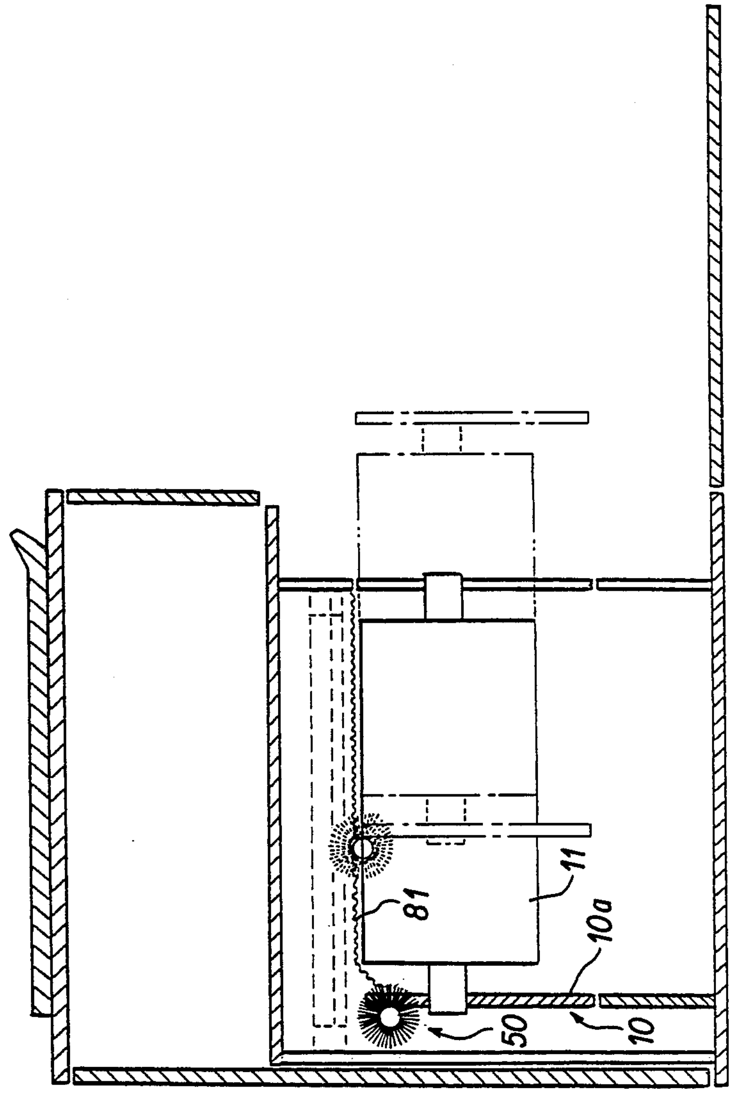
FIG. 18 is a cross-sectional view showing another image-forming apparatus of this invention.
Figure 19:
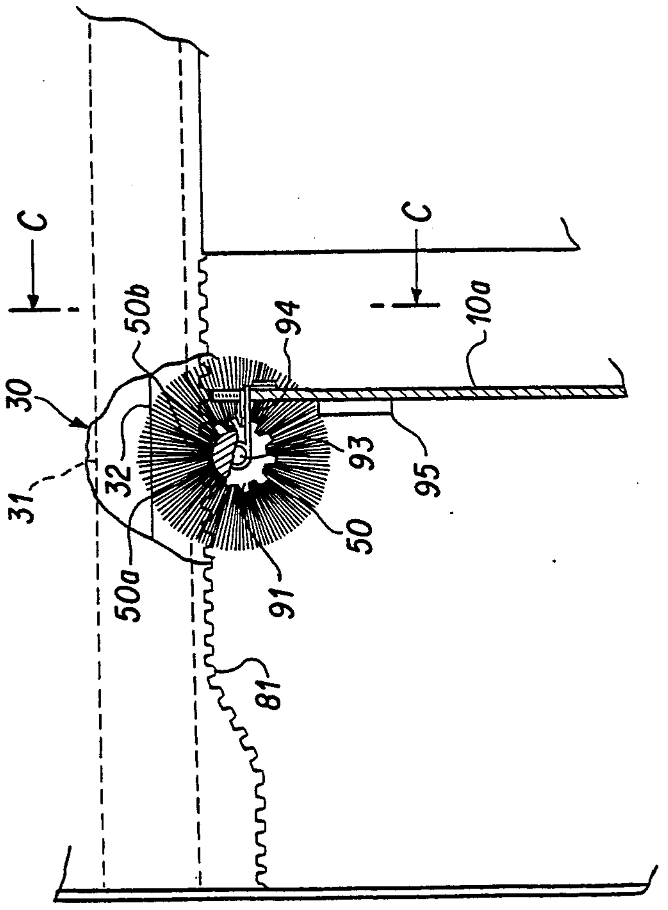
FIG. 19 is a cross-sectional view showing the part containing the cleaning device of the apparatus shown in FIG. 18.
Figure 21:
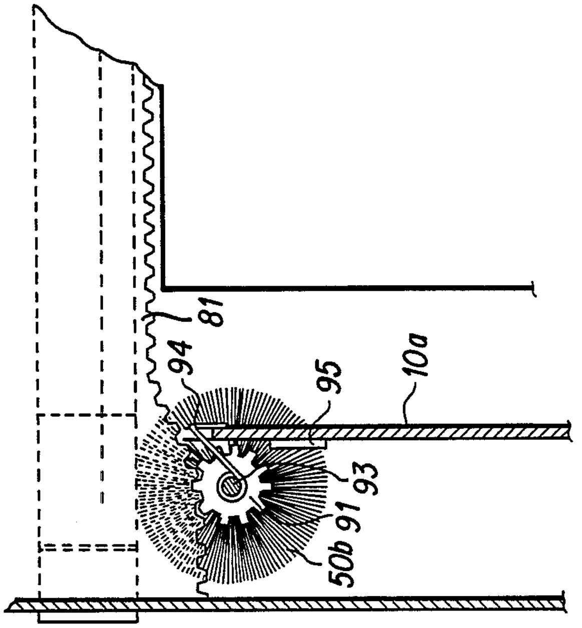
FIG. 21 is a diagram showing the movement of the part of the apparatus shown in FIG. 19.

The bottom surface of a wire supporter 33 that is positioned at the innermost portion of the charger 30 is provided with a guide rack 80. The rack 80, when the image-forming unit 10 is pushed inside of the machine, can be engaged with the gears of the rotatable means 70, and when the image-forming unit 10 is pushed further inside of the machine, the rotatable part 70 revolves because of this engagement. By the revolution of the rotatable means 70, the cleaning device 50, which is made as one piece with the rotatable means 70, moves downward, in oppostion to the force of the coiled spring 74, and its brush portion 50b, as shown in FIG. 16, is separated from the corona wire 32 so as to become horizontal.

At the time of supplying of toner to the inside of the developing apparatus 13, the imageforming unit 10 is pulled in the direction of the axis of the photosensitive drum 11, and the rotatable means 70, which is engaged with the rack 80, moves on the rack 80, resulting in a movement of the cleaning device 50 in an upward direction. Then, as the image-forming unit 10 is pulled out, the gears of the rotatable means 70 separate from the rack 80, and the cleaning device 50 is revolved further upward direction by the force of coiled spring 74, and touches the stopper 75. By this, the tip of the brush portion 50*b* of the cleaning device 50 passes opening 31*a* of the shield box 31 of the charging device 30 so as to touch the corona wire 32. As the image-forming unit 10 is pulled out still more, the brush portion 50*b* moves along the corona wire 32, and by means of this movement, the brush portion 50*b* cleans the silicon compounds, etc., that are adhering to the corona wire 32.

In the case where toner is supplied to the developing device 13 and the image-forming unit 10 is once more installed in the machine, in the same way, the brush portion 50*b* of the cleaning device 50 touches the corona wire 32, cleaning it.

Then, when the image-forming unit 10 is pushed pack into the machine, the gears of the rotatable means 70 that are attached to the innermost portion of the image-forming unit 10 are engaged with the rack 80 that is provided on the back interior surface of the machine. In this situation, if the image-forming unit 10 is pushed in still more, the rotatable means 70 moves on the rack 80, which causes rotation of the cleaning unit 50, which is made in one piece with the rotatable means 70, in the downward direction in opposition to the force of the coiled spring 74, thereby achieving the separation thereof from the corona wire 32. When the image-forming unit 10 is installed in its fixed position inside of the machine, the body 50*a* of the cleaning device 50 is positioned outside of the image-forming unit 10 through the upper part of the cut-out area 10*b* of the side plate 10*a* of the image-forming unit 10, where the brush portion 50*b* is almost perpendicular and are positioned within the cut-out area 10*b*.

EXAMPLE 5

FIGS. 18–21 show another image-formation apparatus of this invention, in which to the side of the shield box 31 of the charger 30, there is a pair of guide racks 81 that are installed over the whole region of the charger 30. Each rack 81 is parallel with the corona wire 32, and the racks 81 are curved in the downward direction so as to be separated from the corona wire 32 at the far inside surface of the body of the machine.

The side plate 10*a* is provided with a pair of pinion gears 91 that form a rotatable means and the cleaning device 50 that is formed in one piece with the pinion gears 91. Both pinion gears 91 are engaged with the racks 81 mentioned above. Each pinion gear 91 is fixed at the supporting shaft 93, which is rotatably supported by a pair of plate springs 94 attached to the side plate 10*a* of the image-forming unit 10. Each plate spring 94 extends from the side plate 10*a* to the back interior side of the machine. The supporting shaft 93 is supported by these extensions of the plate spring 94. Both plate springs 94 push the supporting shaft 93 toward the charger 30. Therefore, the two pinion gears 91 that are attached to the supporting shaft 93 are pushed against the racks 81, and move along the racks 81. Each pinion gear 91 is supported by the side plate 10*a* so that it moves along the plane including the corona wire 32, and moves along the racks 81.

The cleaning device 50 is a rotating brush, which has a body 50*a* in the shape of a cylinder fixed to almost the central part of the supporting shaft 93 that faces the corona wire 32 through the charging opening 31*a*, and the flexible brush portion 50*b* that extends along the entire circumference of the body 50*a*. The tip of the brush portion 50*b* touches the corona wire 32 through the charging opening 31*a* of the charger 30, and moves on the corona wire 32 by the rotation of the supporting shaft 93.

Figure 20:
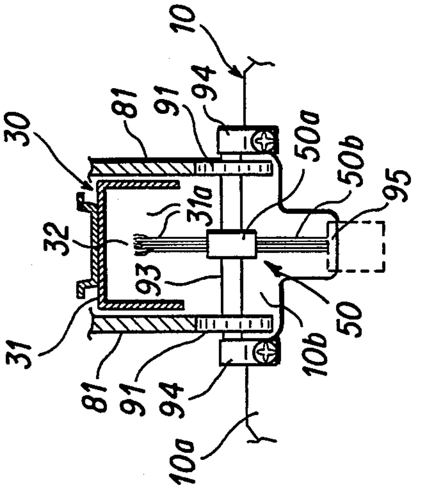
FIG. 20 is a cross-sectional view showing the part of the apparatus shown in FIG. 19 along line C—C.

The side plate 10*a* of the image-forming unit 10 has, as shown in FIG. 20, a cut-out area 10*b* in the region where the pinion gears 91 rotate with the cleaning device 50. The outside surface of the side plate 10*a* has a cleaning means 95 near the cut-out area 10*b*, which is placed so that the tip of the brush portion 50*b* touches the cleaning means 95. For the cleaning means 95, for example, felt can be used. The tips of the brush portion 50*b* touch the cleaning means 95 during the rotation by the brush portion 50*b* of the cleaning device 50, which causes the cleaning of matter that has adhered to the said brush portion 50*b*.

When toner is replenished in the developing apparatus 13, the image-forming unit 10 is pulled out in the direction of the axis of the photosensitive drum 11, and the pinion gears 91 attached to the end of the image-forming unit 10 opposite to the direction of the pulling out rotate while touching the racks 81. When each pinion gear 91 reaches the innermost portion of the rack 81, it is pushed by the plate spring 94 so that it moves in the direction toward the charger 30. By this, the cleaning device 50, to which is attached the supporting shaft 93 that supports the pinion gears 91, also approaches the charger 30, and the brush portion 50*b* touches the corona wire 32 through the charging opening 31*a*. When the image-forming unit 10 is pulled farther from the machine, the pinion gears 91 rotate while touching the racks 81, which causes the rotation of the support shaft 93, resulting in the rotation of the cleaning device 50. Because of the rotation of cleaning device 50, the brush portion 50*b* touches the corona wire 32, and cleans silicon compounds, etc., that have adhered to the corona wire 32.

The matter that has adhered to the corona wire adhere to the tip of the brush portion 50*b* of the cleaning device 50. However, when the cleaning device 50 rotates and the brush portion 50*b* passes through the cut-out area 10*b* of the side plate 10*a* of the image-forming unit 10, the tip thereof touches the cleaning means 95, and the matter that has adhered to the brush portion 50*b* is cleaned therefrom.

When toner is supplied to the developing device 13 and the image-forming unit 10 is installed into the machine, in the same way, the cleaning device 50 touches the corona wire 32 and cleans it. Then, when the side plate 10*a* of the image-forming unit 10 reaches the inner back side of the machine, the pinion gears 91 are guided by the curved racks 81 so as to be separated from the charging device 30, and rotate downward so as to be separated from the charging device 30; together with this movement, the cleaning device 50 is separated from the corona wire 32. When the image-forming unit 10 is installed in its fixed position inside of the machine, the cleaning device 50 is completely separated from the corona wire 32, and is in a place far from the charging region of the corona wire 32.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. An apparatus for the formation of images comprising a body of said apparatus provided with a corona charger, in which a corona wire is strung along a charging opening of said corona charger, and an image-forming means that is installed in the body of the apparatus, said image-forming means being removable from the body of the apparatus along the corona wire, wherein said apparatus further comprises a cleaning device that is attached to an end portion of said image-forming means opposite to a direction in which said image-forming means is pulled out of the body of said apparatus, said cleaning device touching the corona wire through the charging opening when said image-forming means moves along the corona wire and separating from the corona wire when said image-forming means is installed into the body of said apparatus.

2. An apparatus according to claim 1, wherein said cleaning device is a brush comprising a body of said brush and a brush portion fixed to said body, said brush portion being able to touch the corona wire.

3. An apparatus according to claim 2, wherein the body of said cleaning device is attached to the end of said image-forming means opposite to the direction in which said image-forming means is pulled out of the body of said apparatus, and the brush portion of said cleaning device is flexible and is bent by pressure by a fixed means of the body of said apparatus at a time when said image-forming means is installed into the body of said apparatus, thereby separating from said corona wire.

4. An apparatus according to claim 2, wherein the body of said cleaning device is movably attached to the end of said image-forming means opposite to the direction in which said image-forming means is pulled out of the body of said apparatus.

5. An apparatus according to claim 4, wherein the body of said cleaning device is disposed within a box fixed to said end of the image-forming means so that it is pushed by a spring so as to permit the brush portion of said cleaning device to touch the corona wire.

6. An apparatus according to claim 5, wherein the body of said cleaning device is guided by a guiding means in the direction opposite to that of a force of the spring when said image-forming is installed into the body of said apparatus, which causes a separation of the brush portion of said cleaning device from the corona wire.

7. An apparatus according to claim 4, wherein the body of said cleaning device is attached to a rotatable means, as one piece, which is disposed on said end of the image-forming means so as to be rotatable in a circular arc or around an axis of the rotatable means.

8. An apparatus according to claim 7, wherein said rotatable means can rotate at right angles to the corona wire.

9. An apparatus according to claim 8, wherein said rotatable means comprises a rotatable part that is made in one piece with the body of said cleaning device, and a sliding plate that is engaged with said rotatable part so as to be able to slide in the direction in which said image-forming means is pulled from the body of said apparatus, the sliding of said sliding plate resulting in the rotation of said rotatable part.

10. An apparatus according to claim 9, wherein said sliding plate is pushed by the spring so that the brush portion of the cleaning device touches the corona wire when the image-forming means is pulled from the body of said apparatus, and said rotatable plate slides in the direction opposite to that of the force of the spring so that the brush portion of the cleaning device separates from the corona wire when the image-forming means is installed into the body of said apparatus.

11. An apparatus according to claim 7, wherein said circular arc or axis of the rotatable means being in a plane that includes the corona wire.

12. An apparatus according to claim 11, wherein said rotatable means rotates in a circular arc while touching a guide means disposed on an innermost portion inside of the body of said apparatus positioned in the direction opposite to the direction in which the image-forming means is pulled from the body of said apparatus.

13. An apparatus according to claim 12, wherein said guide means is a guide rack, and said rotatable means has gears that are engaged with said rack.

14. An apparatus according to claim 11, wherein said brush portion is radially fixed to said body of the cleaning device.

15. An apparatus according to claim 14, wherein said rotatable means rotates while moving on said guide means disposed over a whole region of the charging opening of the charger.

16. An apparatus according to claim 15, wherein said guide means is curved so that it is separated from the corona wire at the end of the body of said apparatus in the direction opposite to the direction in which the image-forming means is pulled from the body of said apparatus, and said rotatable means is guided by said guide means and rotates.

17. An apparatus according to claim 16, wherein said guide means is composed of guide racks, and said rotatable means is composed of pinion gears that are engaged with said guide racks.

18. An apparatus according to claim 14, wherein a cleaning means is disposed in a region where the brush portion of the cleaning device rotates, whereby matter that has adhered to said brush portion is removed when said brush portion touches the cleaning means during rotation.

* * * * *

UNITED STATES PATENT AND TRADEMARK OFFICE

CERTIFICATE OF CORRECTION

PATENT NO. : 4,811,050

DATED : March 7, 1989

INVENTOR(S) : Toru TANJO et al

It is certified that error appears in the above-identified patent and that said Letters Patent is hereby corrected as shown below:

Column 12, line 6, after "image-forming" insert --means--.

Signed and Sealed this

Thirty-first Day of October, 1989

*Attest:*

DONALD J. QUIGG

*Attesting Officer* *Commissioner of Patents and Trademarks*